(12) United States Patent
Bristot et al.

(10) Patent No.: US 12,065,037 B2
(45) Date of Patent: Aug. 20, 2024

(54) ANTI-VIBRATION MOUNT AND VEHICLE COMPRISING SUCH AN ANTI-VIBRATION MOUNT

(71) Applicant: HUTCHINSON, Paris (FR)

(72) Inventors: Pierre Bristot, Ballan-Miré (FR); Khalid Aazizou, La Chapelle-du-Noyer (FR); David Meunier, Châteaudun (FR)

(73) Assignee: HUTCHINSON, Paris (FR)

( * ) Notice: Subject to any disclaimer, the term of this patent is extended or adjusted under 35 U.S.C. 154(b) by 144 days.

(21) Appl. No.: 17/668,096

(22) Filed: Feb. 9, 2022

(65) Prior Publication Data

US 2022/0371427 A1 Nov. 24, 2022

(30) Foreign Application Priority Data

Feb. 9, 2021 (FR) ..................................... 21 01209

(51) Int. Cl.
*B60K 5/12* (2006.01)
*F16F 1/38* (2006.01)
(Continued)

(52) U.S. Cl.
CPC .............. *B60K 5/1208* (2013.01); *B60K 5/12* (2013.01); *F16F 1/38* (2013.01); *F16F 13/10* (2013.01);
(Continued)

(58) Field of Classification Search
CPC ...... F16F 1/38; F16F 13/10; F16F 2230/0005; F16F 13/1463; F16F 13/107;
(Continued)

(56) References Cited

U.S. PATENT DOCUMENTS 4,889,328 A * 12/1989 Uno .................. F16F 13/22
267/293
4,951,930 A * 8/1990 Uno .................. F16F 7/108
267/293

(Continued)

FOREIGN PATENT DOCUMENTS

DE 3914250 A1 10/1990
EP 0131795 A2 1/1985
FR 2926862 A1 7/2009

OTHER PUBLICATIONS

Preliminary Search Report related to FR2101209; reported on Nov. 10, 2021.

*Primary Examiner* — Robert A. Siconolfi
*Assistant Examiner* — James K Hsiao
(74) *Attorney, Agent, or Firm* — von Briesen & Roper, s.c.

(57) ABSTRACT

Anti-vibration mount comprising a first frame, a second frame, an elastomeric main body connecting the first frame and the second frame, the elastomeric main body allowing relative displacements of the second frame relative to the first frame in a first direction of vibration and in a second direction of vibration perpendicular to the first direction of vibration, the elastomeric main body also being suitable for mounting a weight in the first direction of vibration. An inertia body is connected to the first frame by an elastic suspension interposed between the inertia body and the first frame along the second direction of vibration. An elastomeric lateral abutment body is interposed between the first frame and the inertia body to limit the relative displacements of the second frame with respect to the first frame in the second direction of vibration. The inertia body has a natural frequency lower than 800 Hz.

13 Claims, 15 Drawing Sheets

(51) Int. Cl.
  *F16F 13/10* (2006.01)
  *F16H 57/02* (2012.01)
  *F16H 57/028* (2012.01)

(52) U.S. Cl.
  CPC .... *F16F 2230/0005* (2013.01); *F16H 57/028* (2013.01)

(58) Field of Classification Search
  CPC ............ F16F 2226/04; F16F 2226/045; F16F 2228/066; F16F 2232/08; F16H 57/025; F16H 57/028; B60K 5/12; B60K 5/1208
  See application file for complete search history.

(56) References Cited

U.S. PATENT DOCUMENTS

| | | | | |
|---|---|---|---|---|
| 5,273,261 | A * | 12/1993 | Hamberg | B60K 5/1241 |
| | | | | 180/312 |
| 5,704,598 | A * | 1/1998 | Kojima | F16F 13/10 |
| | | | | 267/140.13 |
| 5,788,207 | A * | 8/1998 | Bunker | F16F 15/08 |
| | | | | 267/141 |
| 9,739,333 | B2 * | 8/2017 | Michiyama | B60K 5/1208 |
| 9,796,255 | B2 * | 10/2017 | Inatomi | B60K 5/1241 |
| 9,933,038 | B2 * | 4/2018 | Kojima | F16F 13/14 |
| 10,316,925 | B2 * | 6/2019 | Maeda | F16F 13/10 |
| 2001/0011790 | A1 * | 8/2001 | Satori | F16F 13/14 |
| | | | | 267/140.13 |
| 2003/0168789 | A1 * | 9/2003 | Kries | F16F 13/105 |
| | | | | 267/140.13 |
| 2004/0188899 | A1 * | 9/2004 | Ichikawa | F16F 13/264 |
| | | | | 267/140.3 |
| 2007/0199742 | A1 * | 8/2007 | Miyahara | B60K 5/04 |
| | | | | 180/374 |
| 2008/0284075 | A1 * | 11/2008 | Saito | F16F 13/105 |
| | | | | 267/140.13 |
| 2009/0321202 | A1 * | 12/2009 | Hamada | F16F 13/1463 |
| | | | | 188/322.5 |
| 2011/0001281 | A1 * | 1/2011 | Kanaya | F16F 13/18 |
| | | | | 267/140.13 |
| 2012/0267184 | A1 * | 10/2012 | Joly | F16F 13/10 |
| | | | | 180/291 |
| 2014/0175719 | A1 * | 6/2014 | Kanaya | F16F 13/106 |
| | | | | 267/140.13 |
| 2015/0226285 | A1 * | 8/2015 | Schnaars | F16F 13/10 |
| | | | | 267/140.13 |
| 2015/0252866 | A1 * | 9/2015 | Muraoka | F16F 13/085 |
| | | | | 267/140.13 |
| 2015/0345583 | A1 * | 12/2015 | Ishikawa | B60K 5/1291 |
| | | | | 267/141 |
| 2016/0201756 | A1 * | 7/2016 | Sakamoto | B60K 5/1208 |
| | | | | 248/634 |
| 2016/0238102 | A1 * | 8/2016 | Goto | F16F 13/103 |
| 2016/0252149 | A1 * | 9/2016 | Scharf | F16F 15/022 |
| | | | | 267/140.13 |
| 2016/0305505 | A1 * | 10/2016 | Kadowaki | B60K 5/1216 |
| 2016/0341275 | A1 * | 11/2016 | Kaneko | B60K 5/1208 |
| 2017/0211648 | A1 * | 7/2017 | Kadowaki | F16F 1/36 |
| 2017/0299013 | A1 * | 10/2017 | Kojima | F16F 15/08 |
| 2017/0335920 | A1 * | 11/2017 | Kanaya | B60K 5/1208 |
| 2018/0023655 | A1 * | 1/2018 | Komiya | F16F 13/10 |
| | | | | 267/140.13 |
| 2018/0163842 | A1 * | 6/2018 | Kim | F16H 57/028 |
| 2019/0072174 | A1 * | 3/2019 | Kim | B60K 5/1225 |
| 2019/0120365 | A1 * | 4/2019 | Kim | F16H 57/028 |
| 2019/0128363 | A1 * | 5/2019 | Kim | F16H 57/025 |
| 2019/0154097 | A1 * | 5/2019 | Lee | F16F 1/3849 |
| 2022/0010858 | A1 * | 1/2022 | Kim | F16F 13/1481 |

\* cited by examiner

ANTI-VIBRATION MOUNT AND VEHICLE COMPRISING SUCH AN ANTI-VIBRATION MOUNT

CROSS-REFERENCE TO RELATED APPLICATION

This application claims priority under the Paris Convention to French Patent Application FR 12 01209 filed Feb. 9, 2021, the content thereof being incorporated herein by reference.

FIELD OF THE DISCLOSURE

This description relates to anti-vibration mounts and vehicles comprising such anti-vibration mounts.

PRIOR ART

Document WO2008152284A1 describes an example of such an anti-vibration device.

SUMMARY OF THE DISCLOSURE

The purpose of this description is in particular to propose an anti-vibration mount enabling the filtering of high-vibration frequencies, in particular for the mounting of electric motors of vehicles or hybrid engine blocks of vehicles comprising an internal combustion engine and an electric motor.

To this end, this description proposes an anti-vibration mount suitable for filtering and damping vibrations between a first element and a second element, said anti-vibration mount comprising:
- a first frame suitable for being fixed to the first element,
- a second frame suitable for being fixed to the second element,
- an elastomeric main body connecting the first frame and the second frame, the elastomeric body allowing relative displacements of the second frame with respect to the first frame at least along a first direction of vibration and along a second direction of vibration perpendicular to the first direction of vibration, the elastomeric main body also being capable of supporting a weight of the second element in the first direction of vibration, the first element being a vehicle body or chassis and the second element being a power unit of the vehicle,
- at least one inertia body connected to the first frame by an elastic suspension interposed between said inertia body and said first frame in the second direction of vibration,
- at least one elastomeric lateral abutment body capable of limiting the relative displacements of the second frame with respect to the first frame in the second direction of vibration,
wherein the inertia body has a natural frequency lower than 800 Hz for vibrations in the second direction of vibration.

With these arrangements, a filtering of high-frequency vibrations is assured (more precisely, a filtering of vibrations of frequencies higher than said natural frequency), in particular in the second direction of vibration.

This effect is achieved without causing the anti-vibration mount to become more sizeable and without degrading its durability (the elastic suspension of the inertia body essentially undergoes compression between the inertia body and the first frame by vibrations oriented in the second direction of vibration).

In various embodiments of the anti-vibration joint, one or more of the following arrangements may possibly also be used (alone or in any of their mutual combinations):
- said elastomeric main body has the external shape of a cone having a top molded onto the second frame and an enlarged base molded onto a rigid base which is rigidly fixed either to the first frame or to the inertia body;
- said inertia body has a natural frequency of between 200 and 700 Hz in the second direction of vibration;
- said inertia body is made of metal;
- said lateral abutment body is integrally secured to the second frame;
- said lateral abutment body is integrally secured at least to the inertia body;
- said lateral abutment body is integrally secured to the first frame and to the inertia body, the second frame being capable of abutting against said lateral abutment body by biasing the inertia body in the second direction of vibration;
- said elastomeric main body is integral with a rigid base which is rigidly fixed to the first frame;
- said elastomeric main body is integral with a rigid base which is rigidly fixed to the inertia body (in this case, the rigid base is connected to the first frame via the inertia body and the elastic suspension);
- said elastic suspension comprises an elastomeric lateral spacer fixed to said inertia body and to said first frame, this elastomeric lateral spacer being arranged to undergo shear under the effect of vibrations in the first direction of vibration and to undergo compression under the effect of vibrations in the second direction of vibration;
- said inertia body comprises two flanges which are perpendicular to the second direction of vibration and which are interconnected by a web, said first frame comprises two side walls respectively facing the two flanges of the inertia body, said elastic suspension comprises two elastomeric lateral spacers each interposed between one of the flanges of the inertia body and a side wall of the first frame, each elastomeric lateral spacer being arranged to undergo shear under the effect of vibrations in the first direction of vibration and to undergo compression under the effect of vibrations in the second direction of vibration, and the anti-vibration mount comprises two elastomeric lateral abutment bodies capable of limiting the displacements of the second frame in two opposite directions by abutment against the flanges of the inertia body along the second direction of vibration;
- said web of the inertia body extends substantially perpendicularly to the first direction of vibration while covering the elastomeric main body and the second frame, the first frame further comprises a cover wall covering said web, and the anti-vibration mount further comprising an elastomeric upper spacer which connects the web of the inertia body and the cover wall of the first frame and which is arranged to undergo shear under the effect of vibrations in the second direction of vibration and to undergo compression under the effect of vibrations in the first direction of vibration, an elastomeric upper abutment body being interposed between the second frame and the web of the inertia body, and said two elastomeric lateral abutment bodies being respectively interposed between the second frame and one of the flanges of the inertia body;
- said upper abutment body is integrally secured to the second frame;

said upper abutment body is integrally secured to the inertia body;

the anti-vibration mount comprises two inertia bodies which are perpendicular to the second direction of vibration, said first frame comprises two side walls respectively facing the two inertia bodies, said elastic suspension comprises two elastomeric lateral spacers each interposed between one of the inertia bodies and a side wall of the first frame, each elastomeric lateral spacer being arranged to undergo shear under the effect of vibrations in the first direction of vibration and to undergo compression under the effect of vibrations in the second direction of vibration, and the anti-vibration mount comprising two elastomeric lateral abutment bodies respectively interposed between the first frame and one of the inertia bodies;

said first frame comprises two side walls interconnected by a cover wall, and the inertia body is arranged between the side walls of the first frame, under the cover wall;

said first frame comprises two side walls interconnected by a cover wall, the inertia body comprises two flanges which are perpendicular to the second direction of vibration and which are interconnected by a web, the flanges of the inertia body framing the first frame in the second direction of vibration and the web of the inertia body covering the cover wall of the first frame;

the anti-vibration mount further comprises an elastomeric upper spacer which connects the web of the inertia body and the cover wall of the first frame and which is arranged to undergo shear under the effect of vibrations in the second direction of vibration and to undergo compression under the effect of vibrations in the first direction of vibration;

the anti-vibration mount further comprises an elastomeric upper abutment body interposed between said second frame and the cover wall of the first frame;

said two elastomeric lateral abutment bodies are formed as one piece with the elastomeric lateral spacers of the elastic suspension and molded onto the second frame by respectively traversing recesses formed in the side walls of the second frame, and said two elastomeric lateral abutment bodies being shaped and arranged so as to bias the flanges of the inertia body when the second frame abuts against said two elastomeric lateral abutment bodies in the second direction of vibration.

Furthermore, the invention also relates to a vehicle comprising a body, a power unit, and at least one anti-vibration mount as defined above connecting the body to the power unit, the elastomeric main body supporting the weight of the power unit along the first direction of vibration, which is vertical.

The power unit may comprise at least one electric motor.

BRIEF DESCRIPTION OF DRAWINGS

Other features and advantages of the anti-vibration mount will become apparent during the course of the following description of five of its embodiments, given as non-limiting examples, with reference to the attached drawings.

In the drawings.

DETAILED DESCRIPTION OF THE DISCLOSURE

In the various figures, the same references designate identical or similar elements.

Figure 1:
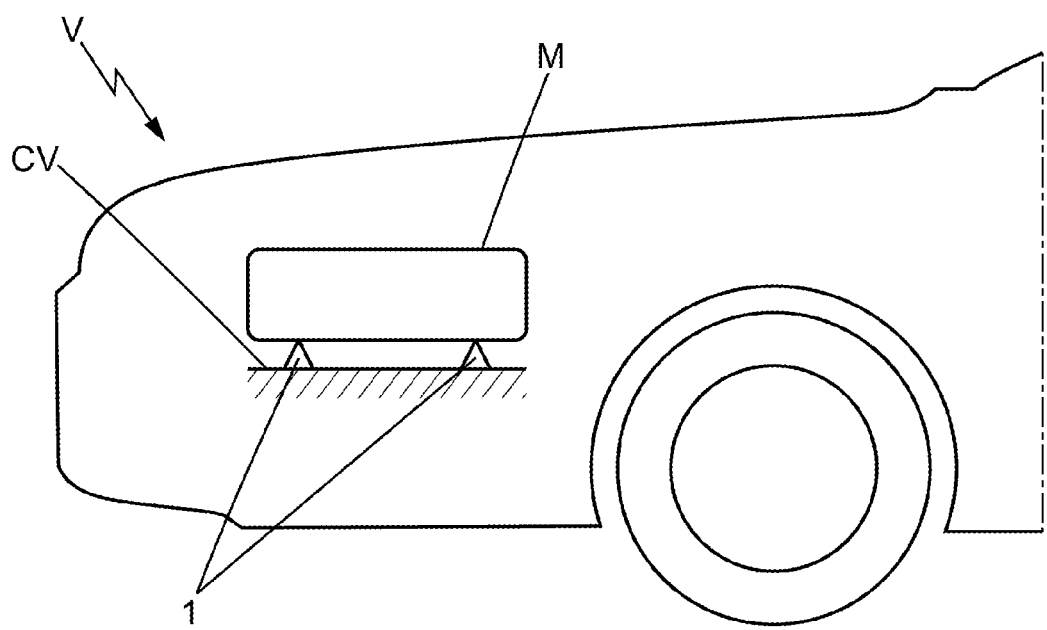
FIG. 1 is a schematic diagram showing a vehicle whose power unit can be supported in particular by one or more anti-vibration mounts according to this description.

FIG. 1 very schematically represents a vehicle V, in particular a motor vehicle, comprising a body CV (or a chassis) and a power unit M connected to the body CV by one or more anti-vibration mounts 1, of which at least one corresponds to this description.

The power unit may in particular be a hybrid engine block comprising an internal combustion engine and an electric motor which are used for the propulsion of the vehicle. Optionally, the power unit may comprise only an electric motor. In both cases, the operation of the electric motor generates relatively high frequency vibrations, typically above 600 Hz.

The anti-vibration mount 1 will now be described, in five embodiments. The first embodiment will be described in detail, and the other embodiments will be described more briefly while highlighting the differences between them. All the features and advantages explained for one of the embodiments are valid for the others, as long as these features and advantages do not contradict the features and advantages of another embodiment.

First Embodiment

Figure 2:
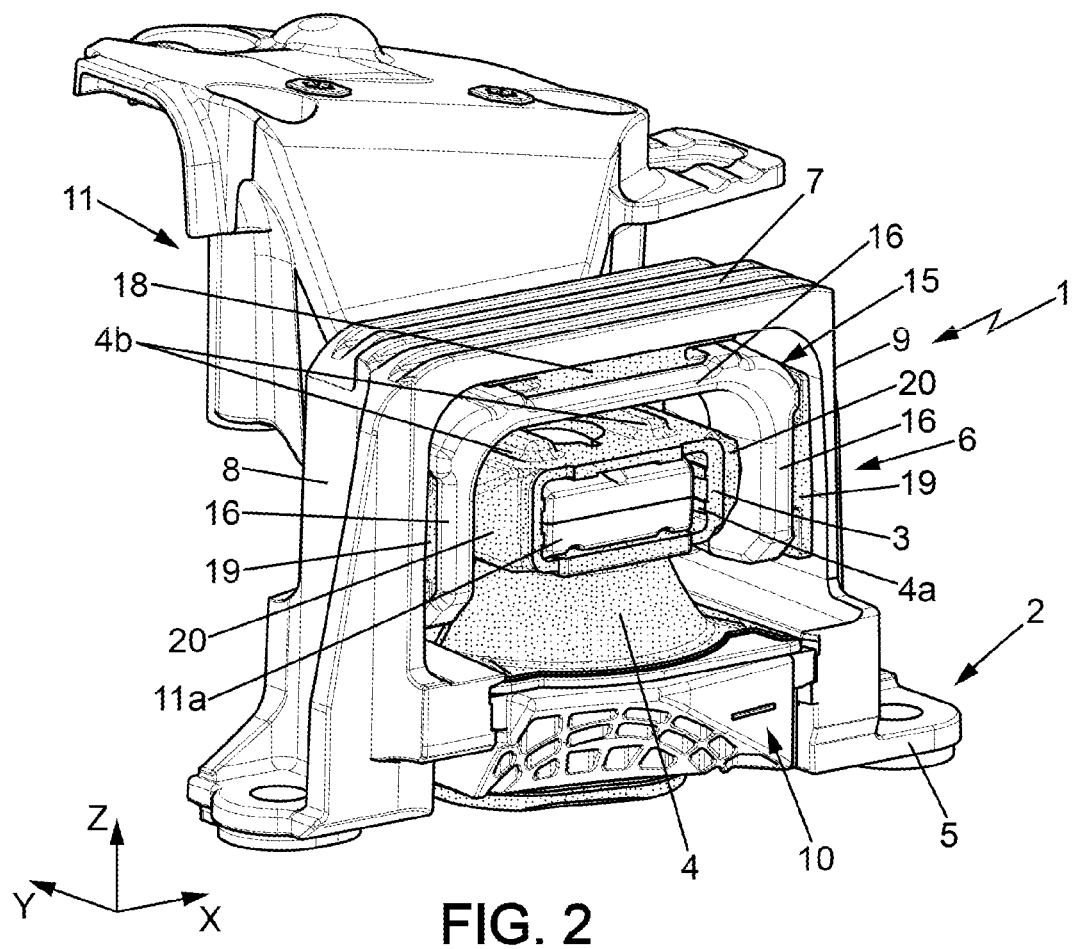
FIG. 2 is a perspective view of an anti-vibration mount according to a first embodiment.
Figure 3:
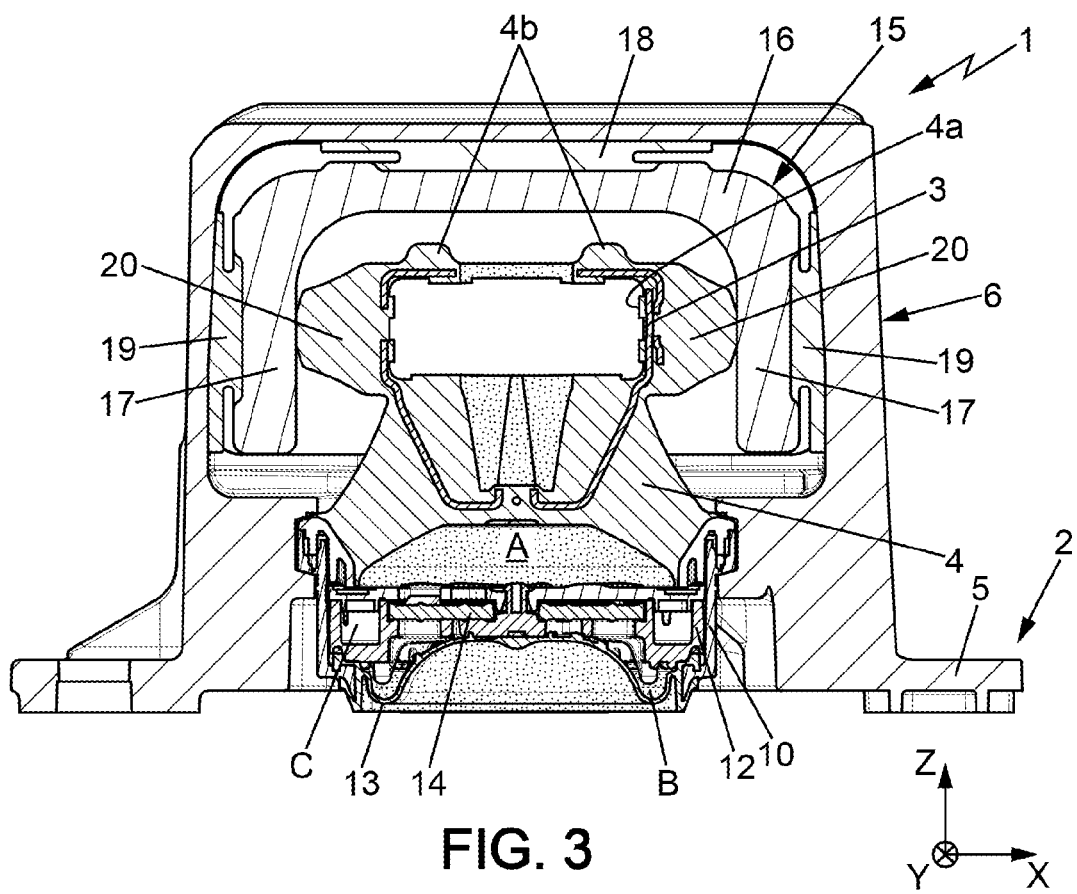
FIG. 3 is a vertical sectional view of the anti-vibration mount of FIG. 2, without the bracket for attachment to the power unit.
Figure 4:
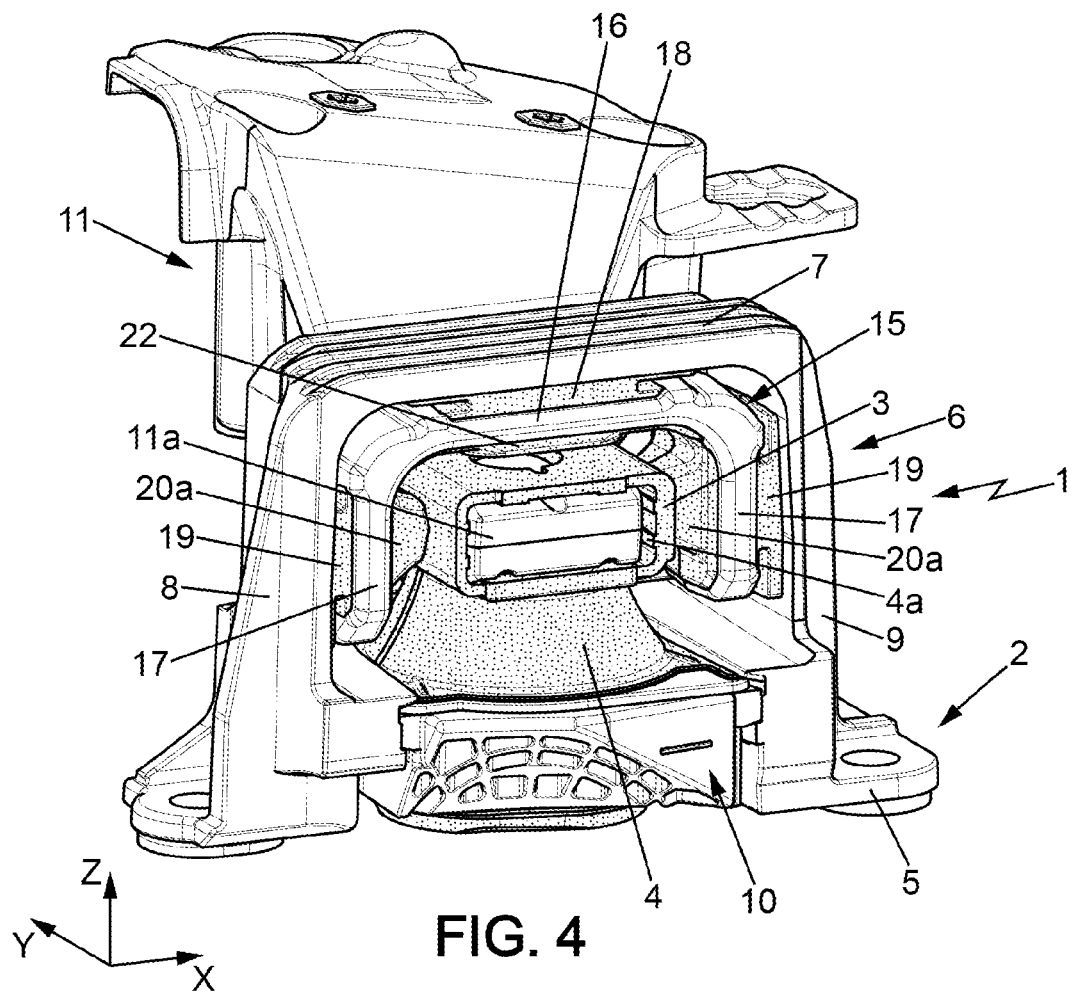
FIG. 4 is a view similar to FIG. 2, in a second embodiment.
Figure 5:
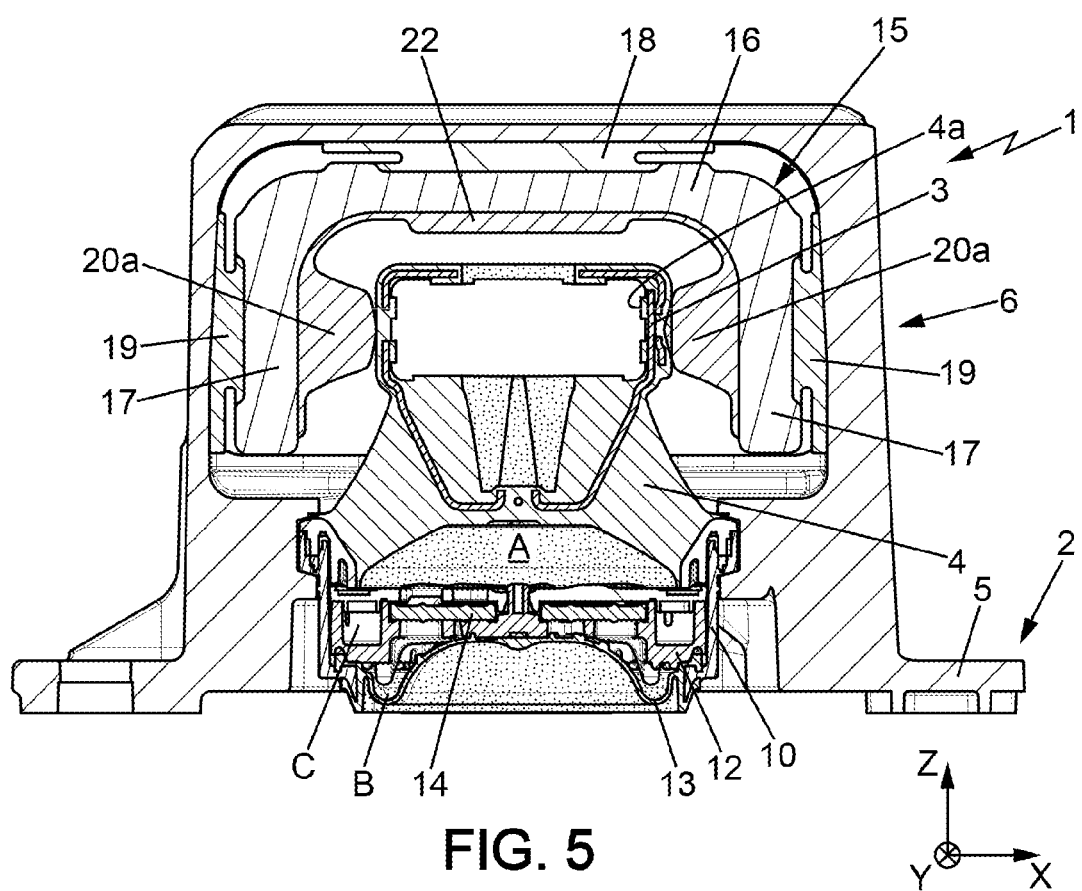
FIG. 5 is a vertical sectional view of the anti-vibration mount of FIG. 4, without the bracket for attachment to the power unit.
Figure 6:
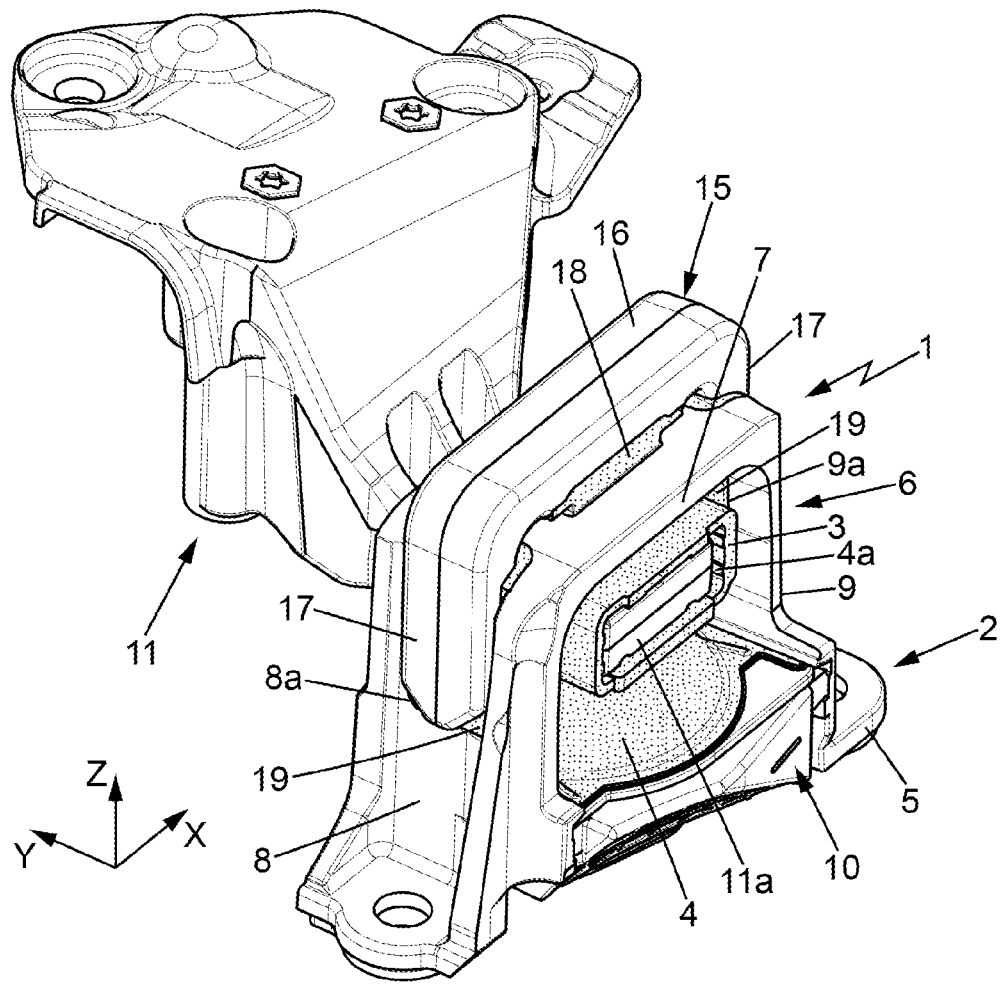
FIG. 6 is a view similar to FIG. 2, in a third embodiment.
Figure 7:
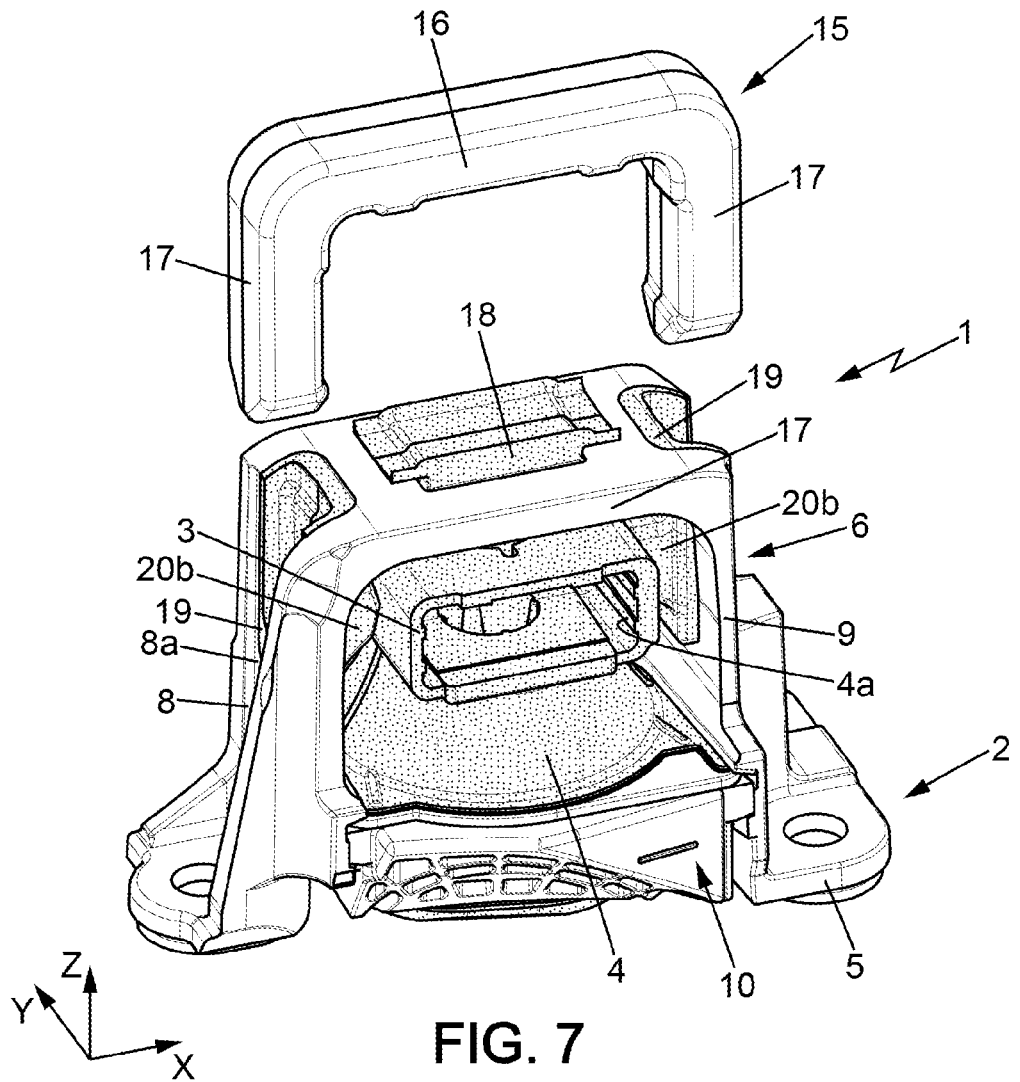
FIG. 7 is a partial exploded view of the anti-vibration mount of FIG. 6, without the bracket for attachment to the power unit.
Figure 8:
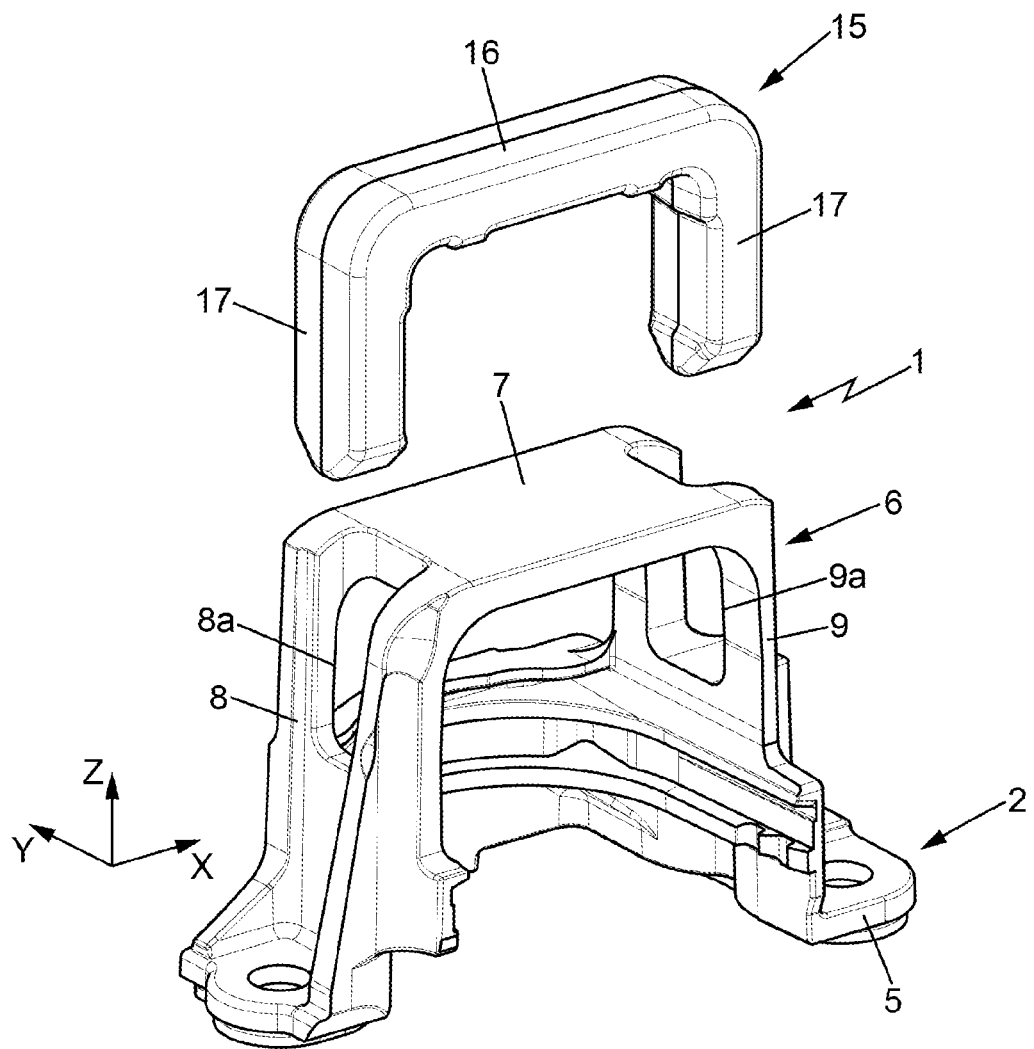
FIG. 8 is a partial exploded view of the anti-vibration mount of FIG. 7, showing only the first frame and the inertia body.
Figure 9:
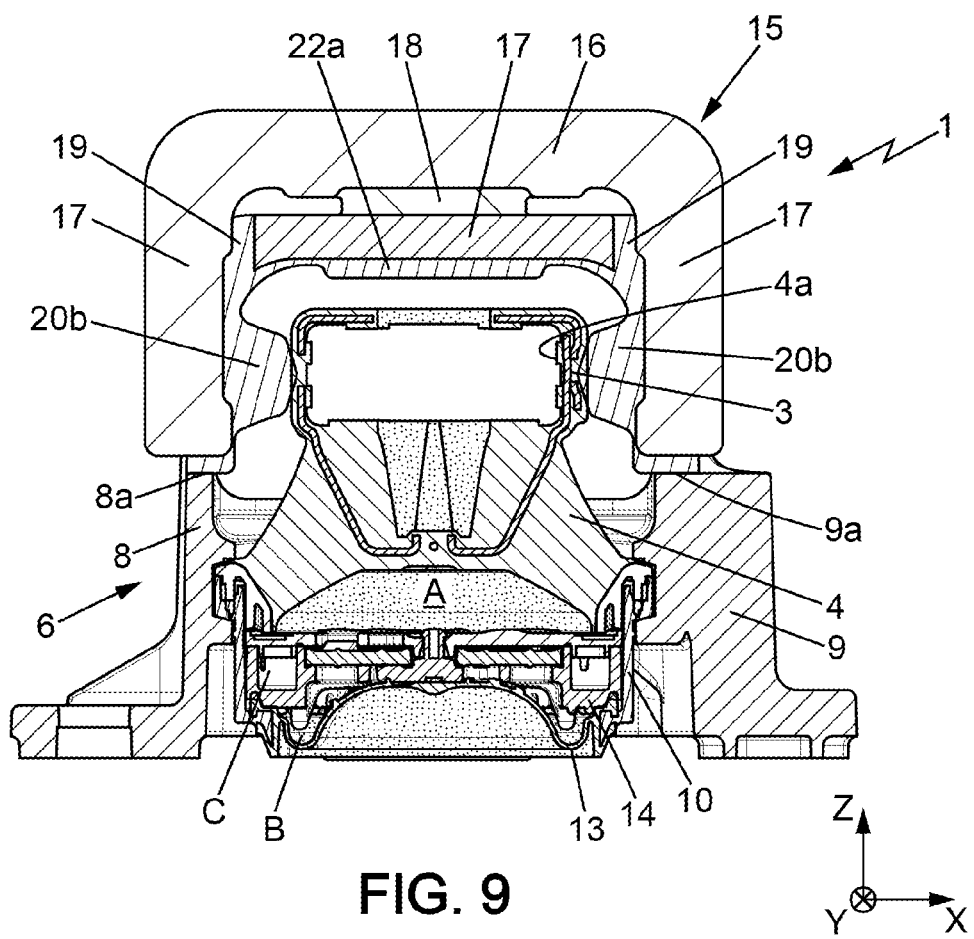
FIG. 9 is a vertical sectional view of the anti-vibration mount of FIG. 6, without the bracket for attachment to the power unit.

In the first embodiment, represented in FIGS. 2 and 3, the anti-vibration mount 1 comprises a first rigid frame 2, suitable for being fixed to a first element, in particular selected among the body CV and the power unit M. For example, the first frame 2 may be fixed to the body CV of the vehicle. The first frame 2 may in particular be made of metal, for example light alloy.

The first frame 2 may for example form a hoop 6, in particular comprising a substantially horizontal cover wall (extending along the X, Y axes) and two substantially vertical side walls 8, 9 (extending along the Y, Z axes). Each of the side walls 8, 9 may comprise a base 5 suitable for being fixed to the body CV of the vehicle, in particular by screwing.

The anti-vibration mount 1 further comprises a second frame 3 suitable for being fixed to a second element, in particular selected among the body CV and the power unit M. For example, the first frame 2 may be fixed to the power unit M of the vehicle, in particular by means of a bracket 11. The second frame 3 may in particular be made of metal, for example sheet steel.

The anti-vibration mount 1 further comprises an elastomeric main body 4 connecting the first frame 2 and the second frame 3.

The elastomeric main body 4 allows relative displacements of the second frame 3 with respect to the first frame 2 at least along a first direction of vibration corresponding to the vertical axis Z and along a second direction of vibration perpendicular to the first direction of vibration, the second direction of vibration corresponding to the horizontal axis X.

The elastomeric main body 4 is also suitable for supporting the weight of the power unit M along the Z axis.

The elastomeric main body 4 may have for example the external shape of a cone having a top molded onto the second frame 3 and an enlarged base molded onto a rigid base 10.

The top of the elastomeric main body 4 and the second frame 3 may for example define a passage 4a which may or may not be a through-passage, open along the Y axis, in which an arm 11a of the bracket 11 is engaged.

The rigid base 10 may be secured to the first frame 2, for example by interlocking and clipping along the Y axis, as explained in the aforementioned document WO2008152284A1.

The anti-vibration mount 1 may be hydraulic. In particular, in a manner that is known per se, the elastomeric main body 4 may be hollow and define, with the rigid base 10, a working chamber A communicating with a compensation chamber B via a constricted passage C, the chambers A, B and the constricted passage C being filled with liquid. The rigid base 10 can form a partition 11 which separates the chambers A and B and which defines the constricted passage C. The compensation chamber B can be defined between the rigid base 10 and a flexible bellows 13 molded onto a lower portion of the rigid base 10. The constricted passage may have a resonant frequency of between 5 and 20 Hz, for example. These arrangements make it possible to damp vibratory movements of low frequency (for example less than 20 Hz) and of relatively large amplitude of the power unit M along the Z axis, due in particular to the rolling movement of the vehicle.

The partition 11 may comprise a decoupling flap 14, also known per se, to filter out vibratory movements of higher frequency (for example above 20 Hz) and of relatively low amplitude of the power unit M along the Z axis, due in particular to the operation of the internal combustion engine of the power unit M.

The anti-vibration mount 1 further comprises an inertia body 15, or possibly several inertia bodies 15. The inertia body 15 may be made of metal, in particular light alloy.

The inertia body 15 is connected to the first frame 2 by an elastic suspension 19 interposed between said inertia body 15 and said first frame 2 along the X axis.

The inertia body 15 may have the general shape of an inverted U, with two flanges 17 extending along the Y, Z axes and a web 16 which connects the two flanges 17 and extends along the X, Y axes. The flanges 17 may each be arranged between the second frame 3 and one of the side walls 8, 9 of the first frame 2, while the web 16 may be located under the cover wall 7 of the first frame 2.

The elastic suspension 19 may comprise two elastomeric lateral spacers each interposed between one of the flanges 17 of the inertia body and a side wall 8, 9 of the first frame 2. Each of these elastomeric lateral spacers may for example be molded and adhered onto the outer face of the corresponding flange 17 and onto the inner face of the corresponding side wall 8, 9.

Each elastomeric lateral spacer may be arranged to undergo shear under the effect of vibrations of the power unit M along the Z axis and to undergo compression under the effect of vibrations along the X axis.

The inertia body 15 and the elastic suspension 19 are sized so that said inertia body has a natural frequency of less than 800 Hz (for example between 200 and 700 Hz, in particular approximately 400 Hz) for vibrations along the X axis, and preferably also for vibrations along the Z axis.

The anti-vibration mount may further comprise an elastomeric upper spacer 18 which connects the web 17 of the inertia body and the cover wall 7 of the first frame 2. The elastomeric upper spacer 18 may for example be molded and adhered onto the lower face of the cover wall 7 and onto the upper face of the web 17.

The elastomeric upper spacer 18 is arranged to undergo shear under the effect of vibrations of the power unit M along the X axis and to undergo compression under the effect of vibrations along the Z axis.

The anti-vibration mount 1 further comprises at least one elastomeric lateral abutment body 20 interposed between the second frame 3 and the inertia body 15 in order to limit the relative displacements of the second frame 3 with respect to the first frame 2 along the X axis.

In particular, the anti-vibration mount 1 may comprise two elastomeric lateral abutment bodies 20 respectively interposed between one of the side walls 8, 9 of the first frame and one of the flanges 17 of the inertia body.

These lateral abutment bodies 20 may be integral with the second frame 3; in particular they may be molded as one piece with the elastomeric main body 4.

The anti-vibration mount 1 may further comprise at least one elastomeric upper abutment body 4b (two in the example shown), interposed between the second frame 3 and the web 16 of the inertia body, in order to limit the displacements of the second frame 3 along the Z axis.

The elastomeric upper abutment body 4b may be integral with the second frame. The elastomeric upper abutment body 4b may be molded as one piece with the elastomeric main body 4.

By means of the inertia body 15, in these arrangements, filtering of the high-frequency vibrations originating from the power unit M is ensured, in particular vibrations of a frequency greater than 600 Hz. Such vibrations may in particular originate from the operation of the electric motor that is part of the power unit M. This filtering is effective in particular for vibrations oriented along the X axis, which is all the more significant when the second frame 3 is bearing against one of the flanges 17 of the inertia body via one of the elastomeric lateral abutment bodies 20, for example when the power unit M is exerting high torque (which is the case in particular when the anti-vibration mount 1 is part of a pendular suspension of the power unit M).

This effect is achieved without increasing the space occupied by the anti-vibration mount and without degrading its durability (the elastic suspension 19 and the elastomeric upper spacer 18 either undergo compression or undergo shear but with an amplitude limited by the general arrangement of the parts of the anti-vibration mount 1).

Second Embodiment

The second embodiment, shown in FIGS' and 5, differs only from the first embodiment in that:
the elastomeric lateral abutment bodies 20a are integral with the inertia body 15 instead of being integral with the second frame 3,
the elastomeric upper abutment body 18 is integral with the inertia body 15 instead of being integral with the second frame 3.

For example, the elastomeric lateral abutment bodies 20a and the elastomeric upper abutment body 22 may be molded as one piece onto the inner faces of the web 16 and flanges 17 of the inertia body 15.

Third Embodiment

The third embodiment, visible in FIGS. 6 to 9, differs from the second embodiment in that the inertia body 15 is outside the first frame 2 instead of being inside.

In particular, the flanges 17 of the inertia body frame the first frame 2 along the X axis and the web 16 of the inertia body covers the cover wall 7 of the first frame.

The elastomeric upper spacer 18 may for example be molded and adhered onto the upper face of the cover wall 7 and onto the lower face of the web 17.

The lateral abutment bodies 20b are integral with the side walls 8, 9 of the first frame 2 and with the flanges 17 of the inertia body. The second frame 3 and the top of the elastomeric main body 4 are capable of abutting against the abutment bodies 20b to limit displacements of the second frame 3 along the X axis.

The lateral spacers of the elastic suspension 19 may be molded as one piece with the lateral abutment bodies 20b, the elastomer of the lateral spacer and of the lateral abutment body 20b on the same side of the anti-vibration mount for example traversing a recess 8a, 9a formed in the corresponding side wall 8, 9 of the first frame.

The two elastomeric lateral abutment bodies 20b are shaped and arranged so as to bias the flanges 17 of the inertia body (through the recesses 8a, 9a) when the second frame 3 abuts against the elastomeric lateral abutment bodies 20b along the second direction of vibration X.

The elastomeric upper abutment body 18 may be integral to the cover wall 7 of the second frame. In particular, the elastomeric upper abutment body 18 may be molded and adhered onto the lower face of the cover wall 7.

Fourth Embodiment

Figure 10:
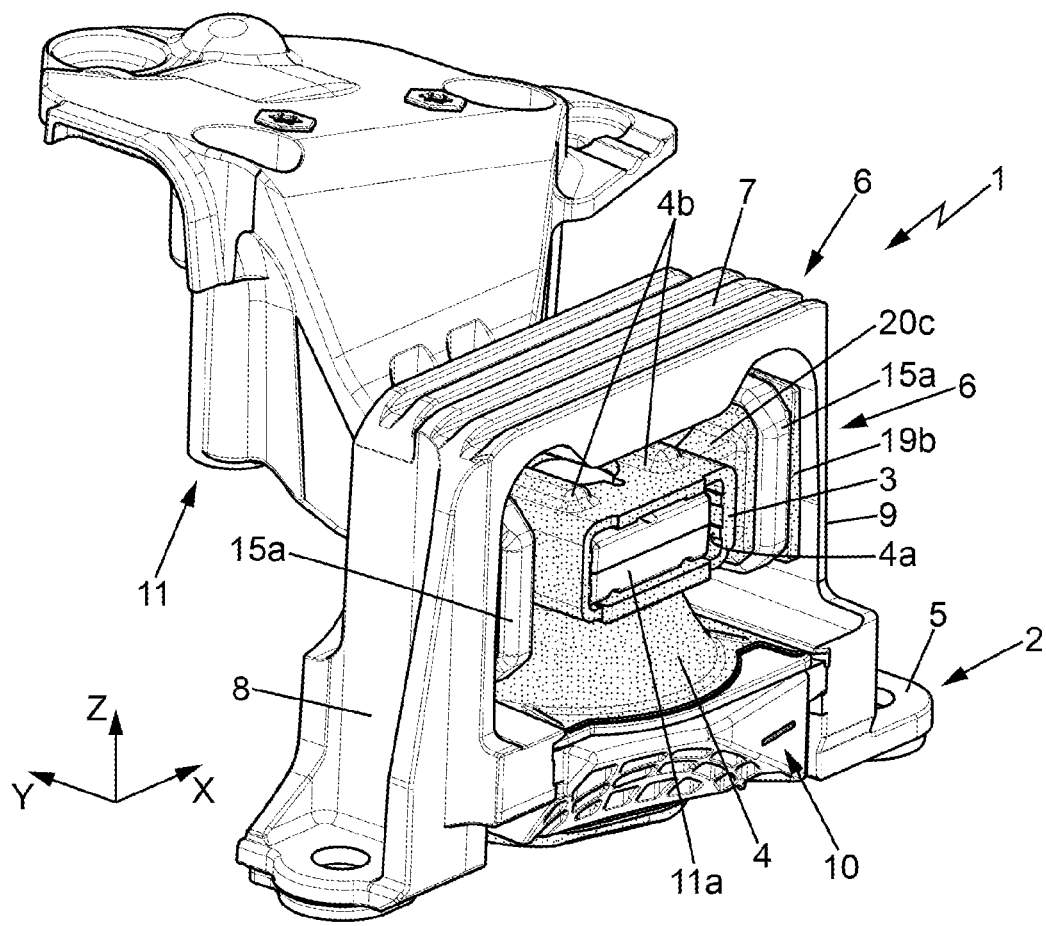
FIG. 10 is a view similar to FIG. 2, in a fourth embodiment.
Figure 11:
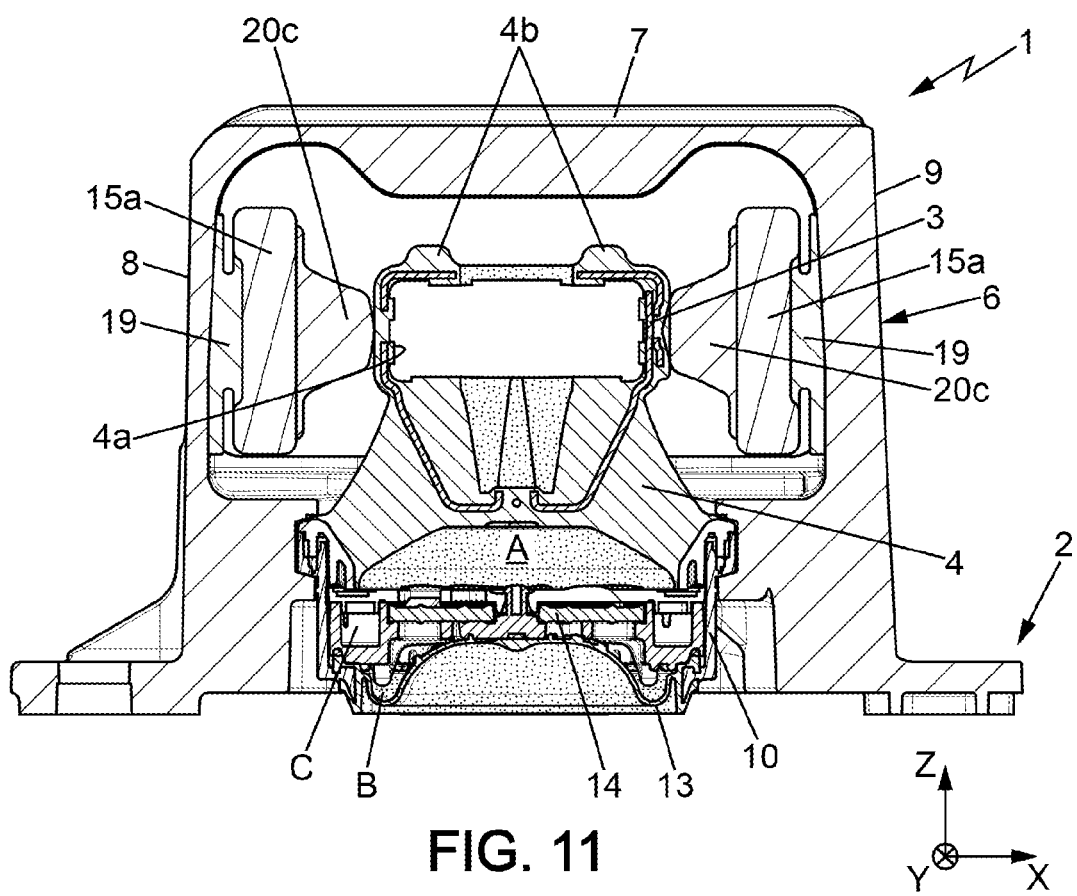
FIG. 11 is a vertical sectional view of the anti-vibration mount of FIG. 10, without the bracket for attachment to the power unit.

The fourth embodiment, shown in FIGS. 10 and 11, differs from the second embodiment in that the anti-vibration mount 1 comprises two separate inertia bodies 15a, which substantially correspond to the two flanges 17 of the inertia body 15 of FIG. 2 but are not interconnected by a web.

The elastomeric lateral spacers of the suspension 19 are respectively molded and adhered onto the outer face of the corresponding inertia body 15a and onto the inner face of the corresponding side wall 8, 9 of the second frame.

The elastomeric lateral abutment bodies 20c are respectively molded and adhered onto the inner faces of the inertia bodies 15a.

The elastomeric upper abutment body or bodies 4b are similar to those of the first embodiment and are capable of abutting against the lower face of the cover wall 7 of the first frame 2.

Fifth Embodiment

Figure 12:
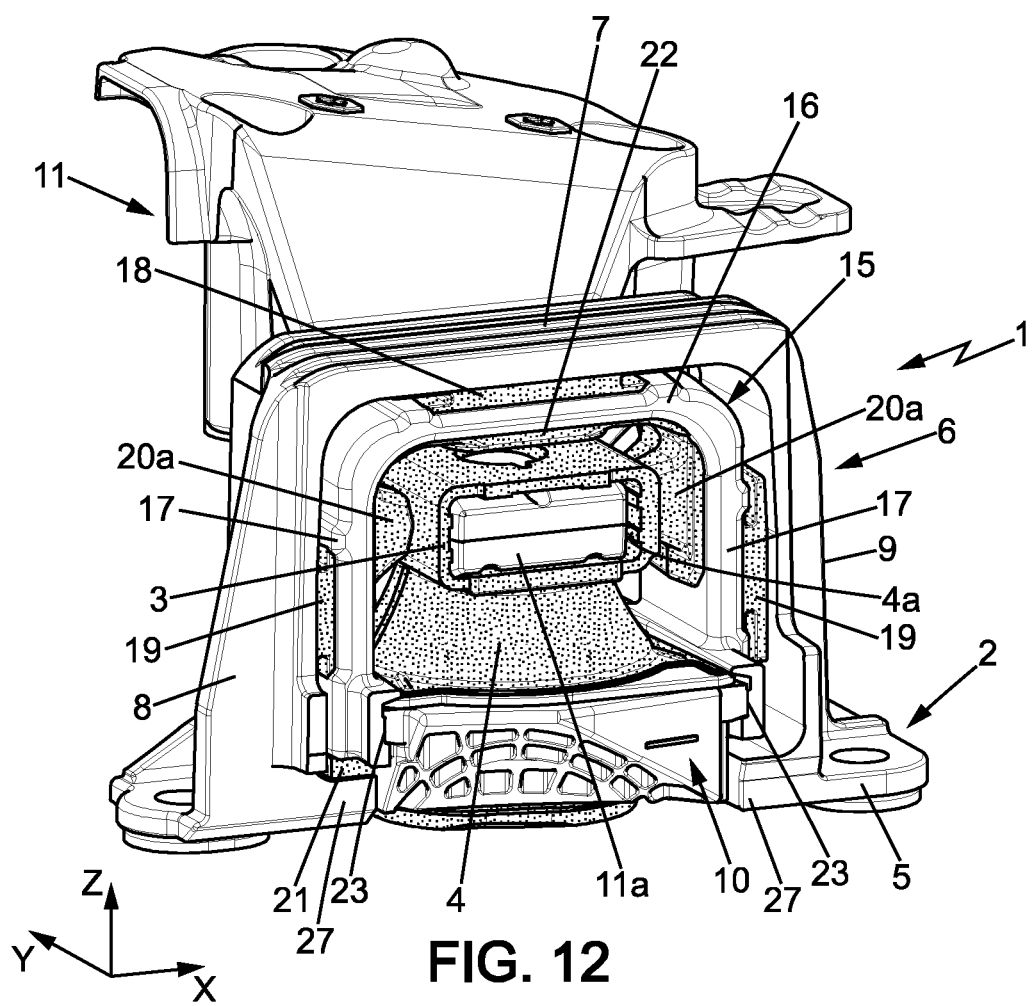
FIG. 12 is a view similar to FIG. 2, in a fifth embodiment.
Figure 13:
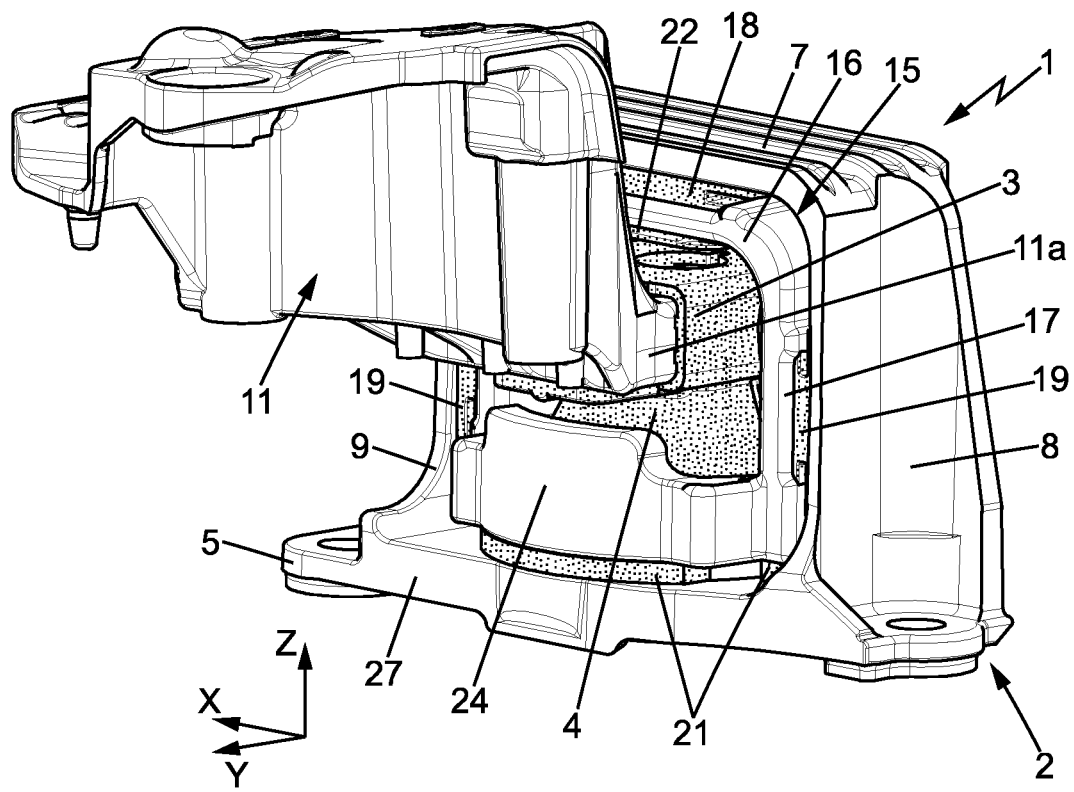
FIG. 13 is a view similar to FIG. 12, in a rear three-quarter view.
Figure 14:
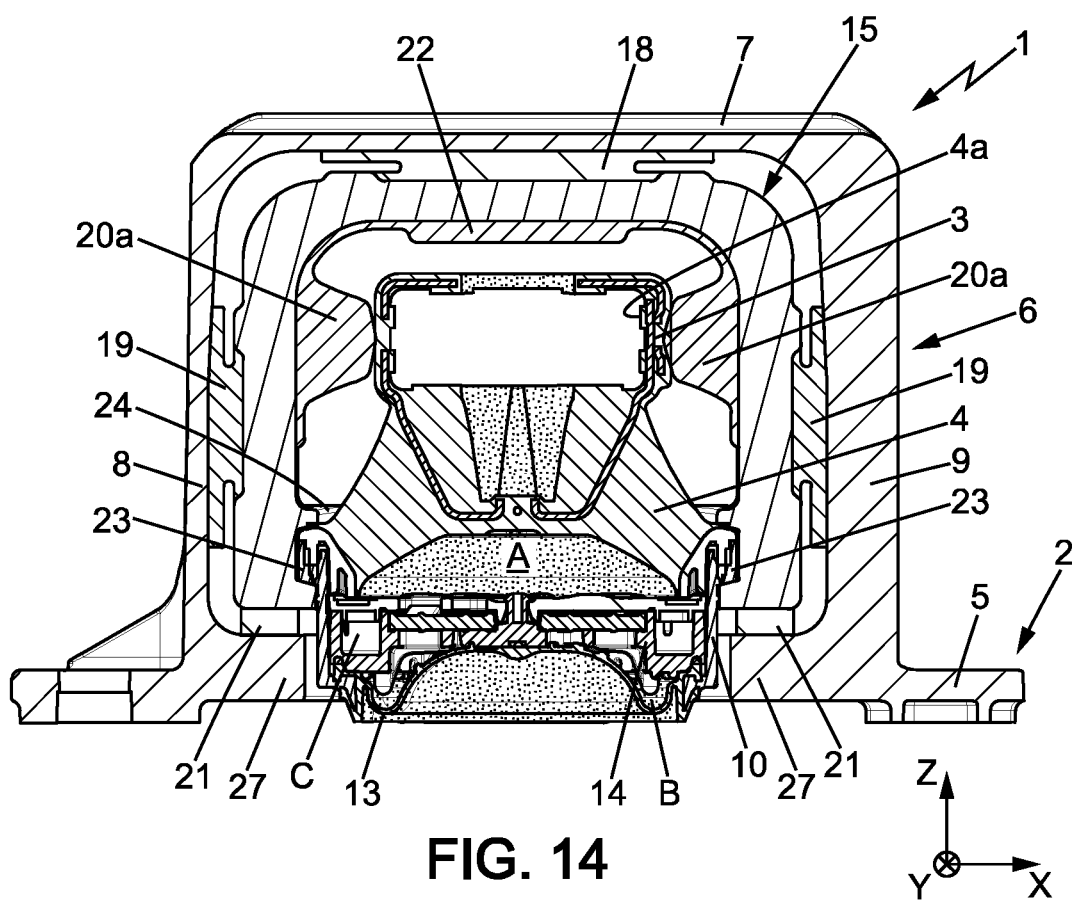
FIG. 14 is a vertical sectional view of the anti-vibration mount of FIG. 12, without the bracket for attachment to the power unit.

The fifth embodiment, shown in FIGS. 12 to 14, differs from the second embodiment in that the rigid base 10 is not rigidly fixed to the first frame.

In this embodiment, the rigid base 10 is connected to the first frame via the inertia body 15 to which the base 10 is rigidly fixed.

The fixing of the rigid base 10 to the inertia body 15 may be carried out by any known means. For example, the rigid base 10 may be fixed to the inertia body 15 by interlocking and clipping along the Y axis, similarly to the fixing of the rigid base 10 to the first frame 2 in the first four embodiments, i.e. as described in the aforementioned document WO2008152284A1 or in a similar manner. To this end, the rigid base 10 may be fitted along the Y axis into two internal side grooves 23 formed towards the lower end of the inner faces of the flanges 17 of the inertia body 15, until abutment against a wall rear 24 connecting said flanges 17.

Elastomeric lower spacers 21 may be interposed between the lower end of the inertia body 15 and a horizontal lower wall 27 of the first frame, in order to support vertically the weight of the power unit M.

Effect of the Invention

Figure 15:
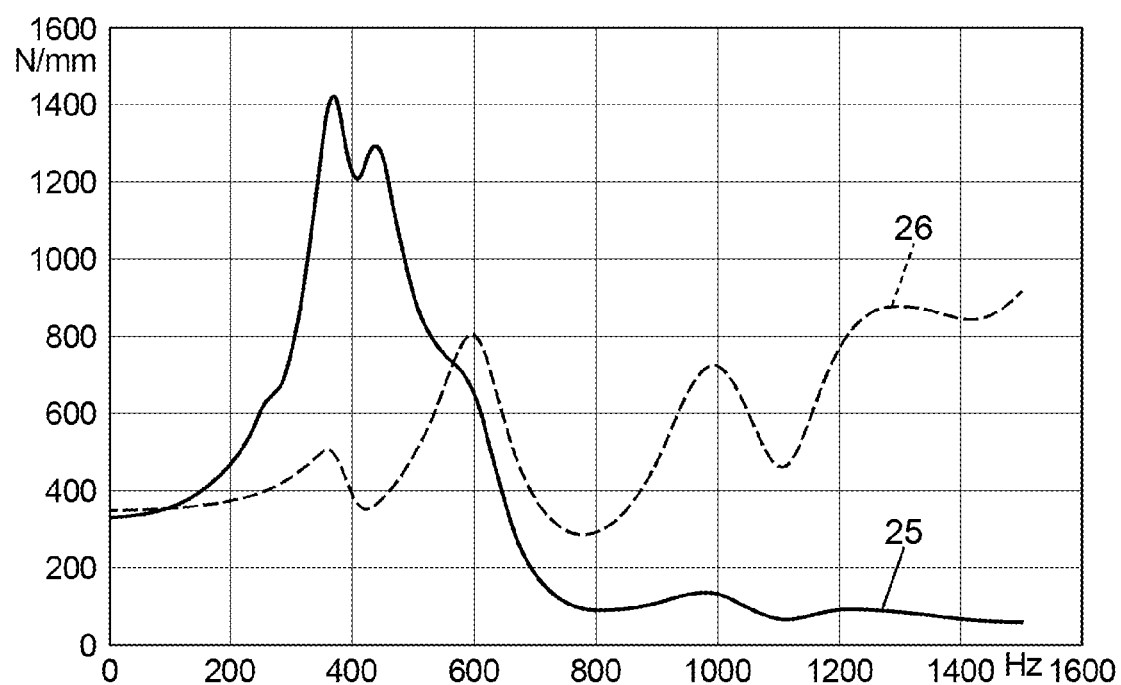
FIG. 15 is a graph showing the dynamic stiffness curve along the X axis, with and without the inertia body, in the fifth embodiment.

FIG. 15 represents the dynamic stiffness curve 25 of the anti-vibration mount of the fifth embodiment along the X axis, compared to the dynamic stiffness curve 26 of a similar anti-vibration mount without an inertia body 15 (meaning an anti-vibration mount similar to that of the second embodiment where the abutment bodies 20 are integral with the side walls 8, 9 of the first frame 2).

This figure shows that the dynamic stiffness of the mount according to the present description decreases markedly from 600 Hz, which allows the effect of filtering high-frequency vibrations along the X axis as explained above, an effect not allowed by comparable devices of the prior art. The anti-vibration mount according to this description also allows the filtering of high-frequency vibrations along the Z axis, in a manner that is at least as effective as in the prior art.

The invention claimed is:

1. An anti-vibration mount suitable for filtering and damping vibrations between a first element and a second element, said anti-vibration mount comprising:
a first frame suitable for being fixed to the first element,
a second frame suitable for being fixed to the second element,
an elastomeric main body connecting the first frame and the second frame, the elastomeric main body allowing relative displacements of the second frame with respect to the first frame at least along a first direction of vibration and along a second direction of vibration perpendicular to the first direction of vibration, the elastomeric main body also being capable of supporting a weight of the second element in the first direction of vibration, the first element being a vehicle body or chassis and the second element being a power unit of the vehicle, at least one inertia body connected to the first frame by an elastic suspension interposed between said inertia body and said first frame in the second direction of vibration, at least one elastomeric lateral abutment body capable of limiting the relative displacements of the second frame with respect to the first frame in the second direction of vibration, wherein the inertia body has a natural frequency lower than 800 Hz for vibrations in the second direction of vibration.

2. The anti-vibration mount according to claim 1, wherein said elastomeric main body has the external shape of a cone having a top molded onto the second frame and an enlarged base molded onto a rigid base which is rigidly fixed either to the first frame or to the inertia body.

3. The anti-vibration mount according to claim 1, wherein said inertia body has a natural frequency of between 200 and 700 Hz in the second direction of vibration.

4. The anti-vibration mount according to claim 1, wherein said inertia body is made of metal.

5. The anti-vibration mount according to claim 1, wherein said lateral abutment body is integrally secured either to the second frame or at least to the inertia body.

6. The anti-vibration mount according to claim 1, wherein said elastic suspension comprises an elastomeric lateral spacer fixed to said inertia body and to said first frame, this elastomeric lateral spacer being arranged to undergo shear under the effect of vibrations in the first direction of vibration and to undergo compression under the effect of vibrations in the second direction of vibration.

7. The anti-vibration mount according to claim 1, wherein said inertia body comprises two flanges which are perpendicular to the second direction of vibration and which are interconnected by a web, said first frame comprises two side walls respectively facing the two flanges of the inertia body, said elastic suspension comprises two elastomeric lateral spacers each interposed between one of the flanges of the inertia body and a side wall of the first frame, each elastomeric lateral spacer being arranged to undergo shear under the effect of vibrations in the first direction of vibration and to undergo compression under the effect of vibrations in the second direction of vibration, and the anti-vibration mount comprising two elastomeric lateral abutment bodies capable of limiting the displacements of the second frame in two opposite directions by abutment against the flanges of the inertia body along the second direction of vibration.

8. The anti-vibration mount according to claim 7, wherein said web of the inertia body extends substantially perpendicularly to the first direction of vibration while covering the elastomeric main body and the second frame, the first frame further comprises a cover wall covering said web, and the anti-vibration mount further comprises an elastomeric upper spacer which connects the web of the inertia body and the cover wall of the first frame and which is arranged to undergo shear under the effect of vibrations in the second direction of vibration and to undergo compression under the effect of vibrations in the first direction of vibration, an elastomeric upper abutment body being interposed between said second frame and the web of the inertia body, and said two elastomeric lateral abutment bodies being respectively interposed between the second frame and one of the flanges of the inertia body.

9. The anti-vibration mount according to claim 1, comprising two inertia bodies which are perpendicular to the second direction of vibration, said first frame comprises two side walls respectively facing the two inertia bodies, said elastic suspension comprises two elastomeric lateral spacers each interposed between one of the inertia bodies and a side wall of the first frame, each elastomeric lateral spacer being arranged to undergo shear under the effect of vibrations in the first direction of vibration and to undergo compression under the effect of vibrations in the second direction of vibration, and the anti-vibration mount comprising two elastomeric lateral abutment bodies respectively interposed between the first frame and one of the inertia bodies.

10. The anti-vibration mount according to claim 1, wherein said first frame comprises two side walls interconnected by a cover wall, the inertia body comprises two flanges which are perpendicular to the second direction of vibration and which are interconnected by a web, the flanges of the inertia body framing the first frame in the second direction of vibration and the web of the inertia body covering the cover wall of the first frame.

11. The anti-vibration mount according to claim 10, wherein said two elastomeric lateral abutment bodies are formed as one piece with the elastomeric lateral spacers of the elastic suspension and molded onto the second frame by respectively traversing recesses formed in the side walls of the second frame, and said two elastomeric lateral abutment bodies being shaped and arranged so as to bias the flanges of the inertia body when the second frame abuts against said two elastomeric lateral abutment bodies in the second direction of vibration.

12. A vehicle comprising a body, a power unit, and at least one anti-vibration mount according to claim 1 connecting the body to the power unit, the elastomeric main body supporting the weight of the power unit along the first direction of vibration, which is vertical.

13. The vehicle according to claim 12, wherein the power unit comprises at least one electric motor.

* * * * *